Feb. 9, 1943. W. A. MELSOM 2,310,250
COUPLING
Filed May 21, 1940
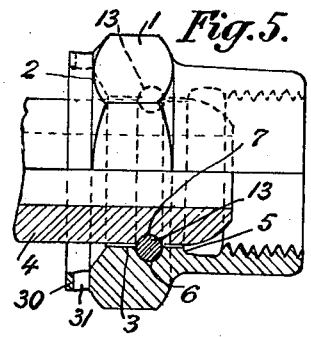
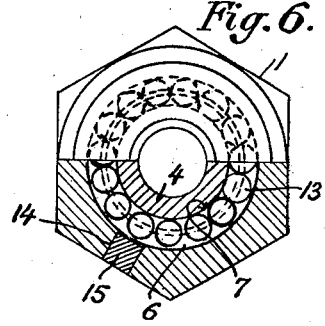
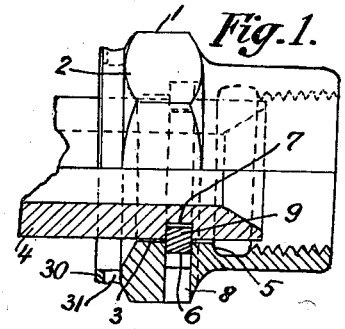
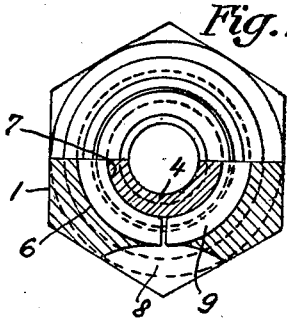
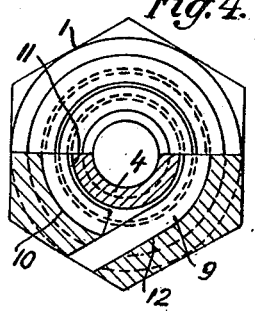
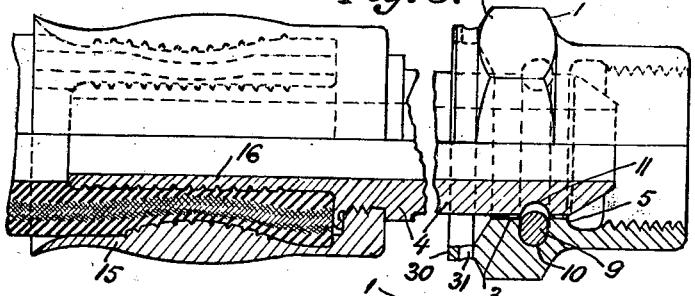
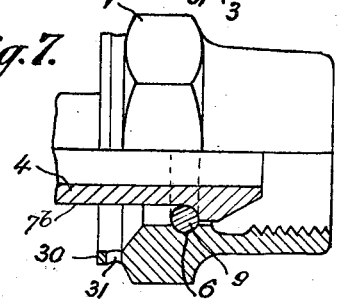
INVENTOR
Walter Arthur Melsom
By Albert F. Nathan
ATTORNEY Patented Feb. 9, 1943

2,310,250

UNITED STATES PATENT OFFICE 2,310,250

COUPLING

Walter Arthur Melsom, Willesden Junction, London, England, assignor to Bowden (Engineers) Limited, London, England, a British company Application May 21, 1940, Serial No. 336,367
In Great Britain April 10, 1940

1 Claim. (Cl. 285—84)

The present invention relates to improvements in hose couplings of that type in which the end of the hose is gripped between a thin walled insert and a surrounding sleeve which is radially contracted onto the hose so as to grip the hose in a compressed condition between the insert and the sleeve and in which a screw-nut is rotatably mounted on the insert and engages with a mating screw on another part of the coupling in order to draw the latter and the insert into end-on sealed relation, and especially to that type of coupling in which the insert and the sleeve are, for facility of manufacture, made of separate parts joined together.

The invention deals with such couplings for medium pressure hoses, by which we mean pressures of from 500 to 2,000 lbs./sq. in., and high pressure hoses, by which we mean pressures up to 15,000 to 20,000 lbs./sq. in., such hoses being employed for the conveyance of gases, liquids, semi-solids or viscous substances.

In order to obtain a strong coupling for these relatively high pressures I can secure a strong joint between the hose, the sleeve and the insert, which I shall term the primary joint, by using a circumferentially continuous thick sleeve, i. e., a sleeve which at least for the main part is thicker than the insert within the hose and when such a sleeve is radially contracted the large amount of metal available for contraction produces a good grip of the hose which in turn tends to hold the sleeve and insert against relative displacement.

In the ordinary way the outer end of the insert is provided with an enlargement and the nut has an internal shoulder and is slidden over the insert from the tail end of the latter, i. e., that end which intrudes into the hose in the finished coupling. This involves making the body of the insert, including the part which is to be jointed to the sleeve, of less diameter than the aperture in the nut. As a result of any deepening of the engagement between the nut and the insert to provide a greater shear resistance between these parts when the nut is drawing together the insert and the companion part with a pressure suited to the higher pressures for which the coupling is intended can only be obtained at the expense of reducing the thickness of the body of the insert and consequently the strength of the joint between the sleeve and the insert which I shall herein term the secondary joint, whereas increase in the strength of such joint commensurate with increase in the shear resistance between the nut and the insert and in the strength of the primary joint is desirable so as not to have a weak link in the coupling. In order to obviate this difficulty I employ a different form of nut-insert connection which enables the required depth of engagement between these parts to be obtained and at the same time allows the strength of the secondary joint to be chosen independently of said connection.

According to the present invention therefore in my medium or high-pressure hose coupling I employ a one piece hollow insert comprising an externally reduced portion which is inserted in the bore of the hose and a separate sleeve member having a circumferentially continuous wall which wholly or partially is thicker than the reduced portion of the insert and this sleeve or the thickened part thereof is radially contracted around the hose in order to compress the hose onto such reduced portion of the insert to form a primary joint between the three parts, and such sleeve is provided with an axial extension which is jointed and axially locked in both directions to the enlarged portion of the insert to form the secondary joint of any suitable strength and in order that the nut may be operatively mounted on the insert without regard to the dimensions of the latter at the region of the secondary joint, the nut insert connection is made by providing the wall of the nut aperture with an annular groove which surrounds an annular groove in the enlarged projecting portion of the insert, the two grooves forming a passage to which access is had through the wall of the nut and means such as a wire or rod curved to a ring form or a series of balls is introduced into said passage. The wire or balls allows the nut to rotate about the insert and takes the thrust when the insert and its companion part are being sealed end-to-end by the nut.

Thus the primary and secondary joints and the shear resistance between the nut and insert may be appropriately increased in strength without varying the standard thread of the nut. Moreover the fitting of the nut to the insert may be done from the outer end of the latter.

We are aware that a nut-insert connection of this kind between a nut and a companion part of a coupling has been previously proposed, but not in combination with primary and secondary joints or for the same purpose, as hereinabove set forth.

Various forms of couplings according to the present invention are illustrated by way of example in the accompanying drawing, in which:

Figs. 1 and 2 are side elevation and end elevation respectively, each being half in section, of one form of coupling; Figs. 3 and 4 are similar views of another and preferred form of coupling; Fig. 3 showing the screw coupling combined with a swaged hose coupling; Figs. 5 and 6 similar views of a further form of the coupling; Fig. 7 is a side elevation, partly in section of another modification.

Referring to Figs. 1 and 2, the coupling nut 1 may be drilled or formed at what is normally its cap end 2 with an aperture 3 large enough to pass clear over the joint end of the insert 4, this hole being preferably made slightly smaller than the internal diameter of the threaded portion of the nut so as to leave a slight shoulder 5.

An internal annular groove 6 is turned or provided in the wall of this hole, and an annular groove 7 of similar cross-section is formed in the external periphery of the insert 4, and these grooves register so as to form a ring-shape passage of rectangular cross-section.

For leading into this passage from the outside of the nut there is formed or drilled in the wall of the nut a transverse slot or hole 8.

When the nut has been assembled in place on the insert by being passed over the grooved connection joint end of the insert and having registered the grooves to form the passage, a wire 9 of suitable section to match the cross-section of the passage is then inserted tangentially into the nut and caused to flex to the arc of the passage, being subsequently dressed off when the whole or substantially the whole of the pasasge has been filled by it.

The passage may be of other cross section. In fact a circular cross-section, as shown in Figs. 3 and 4 is preferred. In this case it is convenient to form registering semi-circular grooves 10, 11 in the insert and the inner wall of the nut respectively. In this form an alternative and preferred entry to the passage is provided in the form of a hole 12 formed in the wall of the nut as a tangential continuation of the passage. In the latter case the wire may fill not only the passage but also the tangential hole leading to it when the wire has been dressed off. The wire is inserted, according to the hand to which the nut is screwed, in such a direction that the action of tightening the nut tends to draw more wire into the nut although as the recess is completely filled, this cannot actually occur.

In the forms previously described the wire locks the nut against axial displacement in either direction along the insert and this may be of advantage when it is desired that the breaking of the screw union should assist in breaking the pipe connection, but in some cases it may be desirable for the nut to be made free to slide back over the insert in which case the groove in the insert may be of sufficient width to permit this action (see 7a, Fig. 15), or alternatively the groove may be replaced by a recess, as shown by 7b in Fig. 7. The effect of this is to provide a lateral opening in the passage which permits of the movement of the nut along the insert in one direction, but does not prevent the wall of the passage from stopping movement of the nut in the other direction.

The fit allowance of the nut and connection joint end of the insert and the size of the grooves are so chosen for preference that approximately half the passage is formed in each part.

When the wire lies one-half in the nut and the other half in the insert and the clearance between the wall of the hole in the nut and the insert is kept fine, any shear action due to axial thrust has the effect either of placing a locking wire of circular section in shear substantially over a diameter rather than a chord or of lessening the tendency of a locking wire of rectangular section to cant.

In the variant form of the invention shown in Figs. 5 and 6, in place of wire, the passage may be filled with balls 13 loaded through a hole 14 which may be radially directed for enabling the hole more readily to be subsequently closed by plug 15 to prevent the escape of the balls.

With this form as in the forms shown in Figs. 1 to 4, the coupling nut may be used to break a pipe connection, since the balls or the wire will thrust against either side of the passage wall.

The thrust face or faces (forming part of the wall of the passage) of the joint end of the insert may be either flat or may be machined with a radius to suit the profile of the inserted wire or balls if desired.

The external contour of the nut may be of plain hexagonal shape in accordance with the standards universally adopted, or the nut may be externally shaped by turning off the hexagons locally to reduce weight or for clearance purposes as desired.

Any suitable material such as brass, gunmetal, aluminium, aluminium bronze, duralumin and steel may be employed to construct the nuts and inserted locking wire.

In one form of coupling nut for use on aircraft pipe installations it is essential to drill a hole or holes transversely through the corner of the hexagon to accommodate a lock wire. This operation is always relatively costly to accomplish and although it can be done on the nut, the subject of the present invention, it is preferred, in one form thereof, to machine the cap end of the nut on its external face to the form of an annular ring 30 projecting away from the thread in an axial direction.

This ring can be arranged to provide ample diametral clearance internally between itself and the mating part of the nut, and lock wire holes 31 can readily be drilled into it in a radial direction to accommodate lock wire.

The present invention enables an improvement to be effected in those flexible hose couplings of the kind in which a contracted ferrule or sleeve of material 15, (Fig. 3) suited to contraction such as brass, duralumin, low carbon steel, or phosphor bronze, clamps the hose onto the insert portion 16.

The fact that the nut is secured to its jointing part by a locking wire or equivalent enables the wall of the jointing part to be increased in thickness where it is engaged by the sleeve or for the depth of the engagement between the nut and the insert to be increased without reducing the thickness of the remaining part of the insert. In this way it becomes possible to strengthen such couplings and in cases where the insert is desired to be screwed into the sleeve sufficient metal is available to allow the insert to be screw threaded behind a shoulder and yet leave sufficient strength at the root of the thread to resist the internal working pressure in the hose and the radial contracting pressure clamping the hose on the insert.

As the nut can be attached to the insert after the latter has been coupled to a hose all the operations incidental to making the coupling between the insert and the hose can be effected without hindrance by the presence of the nut.

As hereinbefore stated we prefer to use a locking wire 9 of circular cross-section. If a radial shoulder on the nut bears against the radial face which is formed immediately behind an externally spherical or conical sealing end of the insert there is a liability for the outer part of such radial face to wear away and for the inner edge of the internal flange on the nut to take the thrust. When this takes place the flange is liable to be bent back. The circular wire and passage are particularly adapted to avoid this disadvantage especially when an externally cylindrical portion of the insert separates the groove in the insert from the externally spherical or conical end of the insert as shown in Figs. 3, 5 and 7.

What I claim is:

A medium or high pressure hose coupling component, comprising a flexible hose having tubular walls of rubber or like material and at least one tubular reinforcing layer, a one-piece hollow metal insert having an externally reduced portion inserted in the bore of said hose and an enlarged portion beyond the end of the hose terminating in an outer end portion adapted to be brought into sealing relation end to end with a companion fitting, a separate metal sleeve member having a circumferentially continuous wall which is radially contracted around the hose to grip the hose firmly between itself and the insert and seal the inner wall of the hose with the insert, said sleeve extending beyond the end of the hose so as to circumferentially engage the said enlarged portion of the insert, cooperative means interlocking said sleeve and insert together beyond the end of the hose against relative axial movement in either direction, a nut slidable over the said fitting engaging end portion of the insert extending beyond the end of said sleeve and said axial interlock, the inner wall of the nut and the one-piece insert where the integral outer portion thereof projects beyond said axial interlock with the sleeve each having an annular groove, said grooves registering to form a ring shaped passage and means introduced into and around the said passage to transmit the end thrust of the nut to the one-piece insert when the insert and its companion fitting are being sealed end to end by screwing said nut to the part to which the coupling component is to be fitted.

WALTER ARTHUR MELSOM.